(12) United States Patent
Meyer

(10) Patent No.: US 6,899,920 B2
(45) Date of Patent: May 31, 2005

(54) METHOD FOR THE BATCH COATING OF SAW WIRE

(75) Inventor: Juergen Meyer, Kempten (DE)

(73) Assignee: ESK Ceramics GmbH & Co. KG, Munich (DE)

( * ) Notice: Subject to any disclaimer, the term of this patent is extended or adjusted under 35 U.S.C. 154(b) by 0 days.

(21) Appl. No.: 10/463,738

(22) Filed: Jun. 17, 2003

(65) Prior Publication Data

US 2004/0001922 A1 Jan. 1, 2004

(30) Foreign Application Priority Data

Jun. 27, 2002 (DE) .......................................... 102 28 843

(51) Int. Cl.⁷ .............................................. B65H 54/00
(52) U.S. Cl. ....................... 427/178; 427/435; 427/436; 427/327
(58) Field of Search ............................. 427/430.1, 435, 427/436, 327, 178; 118/428, DIG. 18, DIG. 22

(56) References Cited

U.S. PATENT DOCUMENTS

| | | | | |
|---|---|---|---|---|
| 3,050,267 A | * | 8/1962 | Tragert .................. | 242/364.11 |
| 3,199,254 A | * | 8/1965 | Baron ........................ | 428/614 |
| 4,852,998 A | * | 8/1989 | Kopp ........................... | 51/309 |
| 6,261,437 B1 | | 7/2001 | Hernnaes et al. | |
| 2003/0140914 A1 | * | 7/2003 | Lukschandel et al. ........ | 125/21 |

FOREIGN PATENT DOCUMENTS

| | | | |
|---|---|---|---|
| DE | 2 259 299 | 6/1974 | |
| DE | 2 451 803 | 5/1976 | |
| JP | 09-1455 A | * 1/1997 | .......... B24B/27/06 |
| WO | WO 0 185 376 | 11/2001 | |

OTHER PUBLICATIONS

English Derwent Abstract AN 1974-43882V [24] corresp. to DE 2 259 299.

English Derwent Abstract AN 1976-36197X [20] corresp. to De 2 451 803.

* cited by examiner

*Primary Examiner*—Bret Chen
(74) *Attorney, Agent, or Firm*—Brooks Kushman P.C.

(57) ABSTRACT

A method for the rapid coating of a wire in a batch coating installation, wherein the wire is wound onto a product carrier and is then passed through a coating installation in batch mode in the manner which is customary for the coating of a wire.

16 Claims, 2 Drawing Sheets

METHOD FOR THE BATCH COATING OF SAW WIRE

BACKGROUND OF THE INVENTION

1. Field of the Invention

The present invention describes a method for the coating of a saw wire with a metal or a metal alloy in which hard materials are embedded.

2. Background Art

The coating of wires for sawing operations is generally carried out in such a manner that a metal is applied to the wire by chemical or electrodeposition means and simultaneously, abrasive particles of high hardness required for sawing are embedded in this metal. A method of this type and the advantageous properties of a wire which has been coated in this way are described in published PCT application WO 01/85376, published on Nov. 15, 2001, and its European equivalent, EP 128 06 29 A1. Wires of this type are used to saw materials which are used, for example, in the semiconductor and optical industry.

Sawing with a coated wire of this type is preferably carried out on multiwire saws which require wire lengths of greater than 1000 m for operation. Hitherto, the coating of a wire by electrodeposition has been carried out in a continuous process. The wire runs from a stock reel and is fed into the coating apparatus. The coating apparatus comprises linearly arranged bath vessels which contain the various pretreatment chemicals, rinsing water and finally the coating bath. This design of the apparatus enables the wire to be guided through the individual baths over a large number of guide rolls. The guide rolls are inevitably installed in bath vessels which contain aggressive liquid media. This has the disadvantageous consequence that the bearings of the guide rolls rapidly become worn. After the pretreatment has ended, the wire passes into the coating bath, where a layer of metal in which abrasive particles are simultaneously embedded is deposited on the wire surface. The abrasive particles have to be incorporated in sufficient quantities over the entire circumference of the wire and homogeneously over the length of the wire. This requires the deposition rate to be kept at a low level. The dwell time of the wire through the apparatus as a whole is determined by this final, time-consuming step. On account of the linear passage of the wire and the low deposition rate in the coating bath, low wire passage rates are required in order to obtain the desired layer thicknesses and concentrations of abrasive particles. After coating has taken place, the wire is wound onto a further reel at the end of the installation. A continuous electrode position coating process of this type is known, for example, from JP-B-4105. The latter document describes a wire passage rate of 60 mm/min and a coating time of 10 minutes. This results in a bath length of 60 cm. Accordingly, it would take approximately 280 hours to coat a wire length of 1000 m. An even lower wire passage rate is required if the coating, as described in EP 128 06 29 A1, is applied using a chemical process. On account of the lower deposition rate caused by process conditions, the passage rate is reduced to approximately 25 mm/min given otherwise identical boundary conditions. Accordingly, in this process it takes approximately 670 hours to coat 1000 m of wire.

SUMMARY OF THE INVENTION

It was an object of the invention to provide a method which makes it possible to coat even a wire of considerable length within a relatively short time in a conventional batch coating apparatus. These and other objects are achieved by employing one or more cage-like devices onto which wire to be coated is wound, followed by coating in a conventional coating bath in a batch operation.

DETAILED DESCRIPTION OF THE PREFERRED EMBODIMENT(S)

The product carrier consists of a plurality of open reels of increasing diameter, each open reel formed from a plurality of carriers arranged in a geometric pattern, preferably about a common central axis.

The product carrier is preferably cylindrical in form and comprises two side plates and a center spindle which connects and stabilizes the two side plates, the side plates each having an inner side, outer side, and a periphery and being produced in such a way that on the inner side of the plates, bars are removably mountable between the side plates at different distances from the center spindle, the periphery preferably having at least one encircling recess. Each set of a plurality of bars forms an open reel onto which wire can be wound. For ease and automation of winding, the open reels are preferably concentric about a common axis.

It may in some cases be desirable for the first 200 m of a coated saw wire to be coating-free, since this makes it easier to fit the wire web in multiwire saws. If so, this 200 m of wire can be wound into the encircling recess, and then protected from liquid and therefore from being coated, by a covering strip.

It is preferable for a drive wheel which allows rotary driving in the treatment baths to be secured to the outer side of a side plate.

The wire positioning preferably takes place as follows. The wire is wound onto the product carrier in the following way: a plurality of cross-bars or "carrier bars" with a defined arc spacing are secured to the side walls at a defined distance from the center axis, so that they form a cage, as it were, a wire end of a wire which is to be coated is secured directly from a stock reel in the region of one side plate to one of the cross-bars, the product carrier is set in a defined rotary motion, while at the same time wire is supplied in a defined linear motion parallel to the center spindle of the product carrier, the wire being wound onto the cage with a pitch which results from the setting parameters (rotary motion/ linear motion). When the second side wall is reached, the winding operation is interrupted and the next cage, formed from eight further cross-bars, is placed at a defined distance from the first cage, the winding operation described above for the first cage is continued, with the linear motion now in the opposite direction. When the first side wall is again reached, the winding operation is interrupted again and the next cage formed from further cross-bars is placed at a defined distance from the second cage, the wire is applied to the third cage as described for the first cage, the procedure being continued in a similar way until the outermost cage is reached, and after the last layer of wire has been applied to the outermost cage, the end of the wire is secured to the side plate or to a carrier bar.

Figure 1:
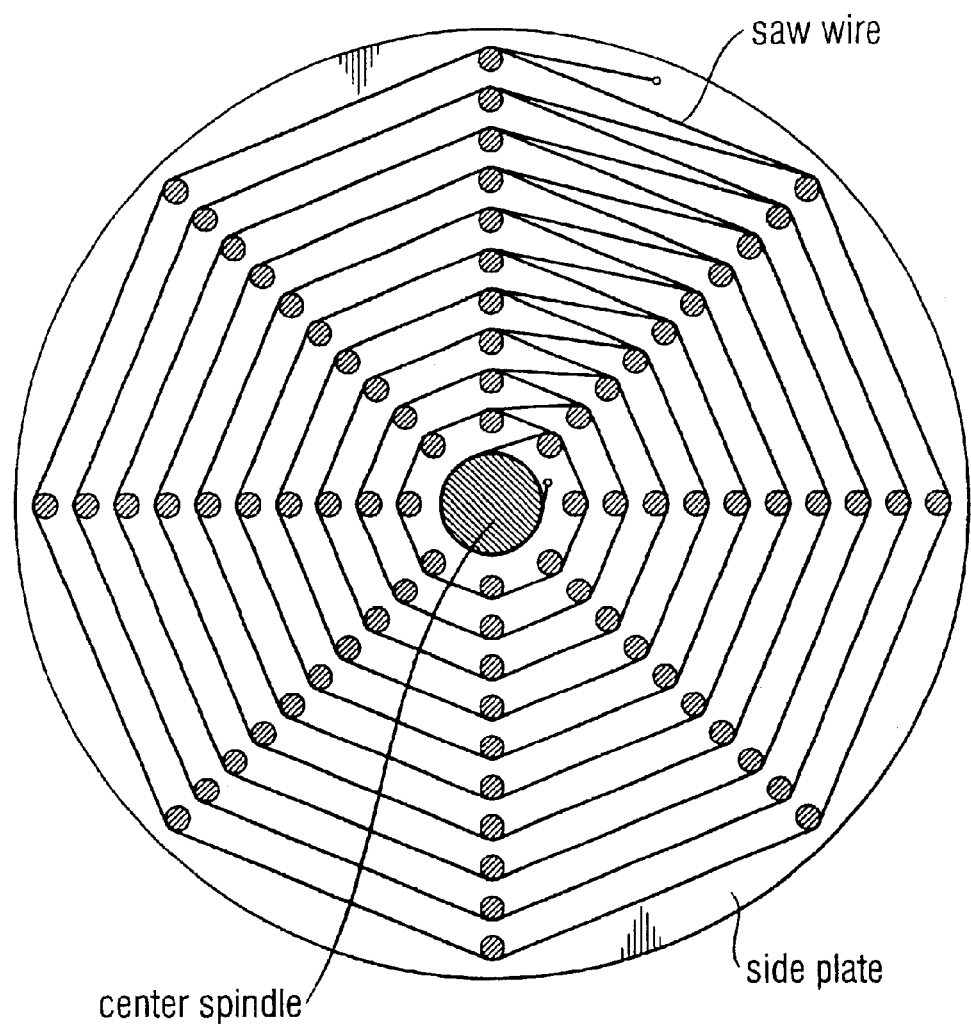
FIG. 1 shows a cross section through a product carrier to which wire has been fitted.
Figure 2:
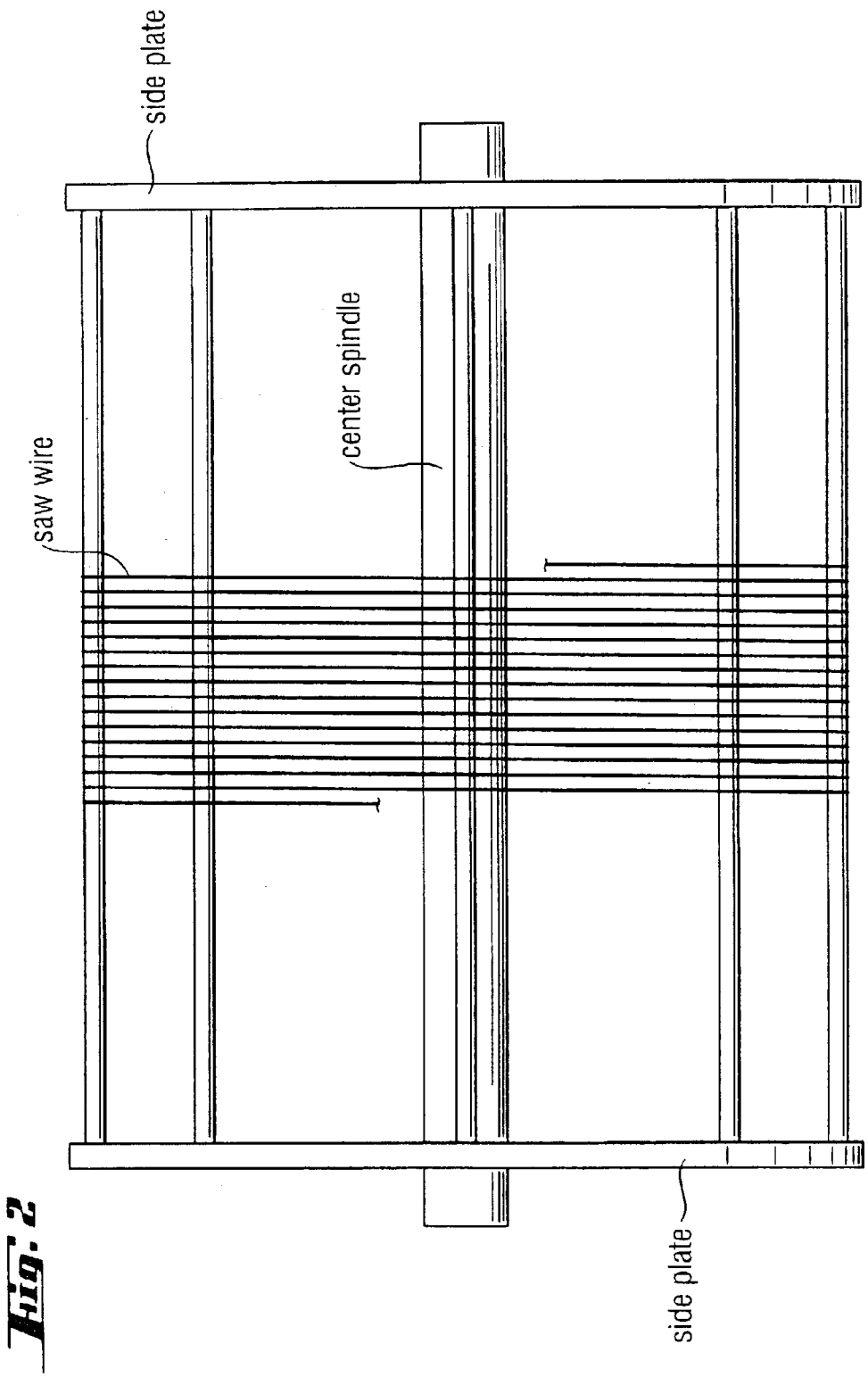
FIG. 2 shows a side view of a product carrier which is partially covered with wire. Only part of the outer layer is illustrated.

The method is described below by way of example for 2000 m of wire and a cylindrical product carrier with a diameter of 300 mm and a length of 380 mm. (FIG. 1, FIG. 2). In the first step, eight cross-bars with an arc spacing of 45° are secured to the side walls at a distance of 5–10 cm from the center spindle, so that they form an "open reel" or "cage", as it were. A wire end of a wire which is to be coated is secured directly from the stock reel, in the region of one side plate, to one of the cross-bars. The product carrier is set in defined rotary motion, while at the same time the wire is supplied in a defined linear motion parallel to the center spindle of the product carrier. The wire is wound onto the cage at the pitch which results from the setting parameters (rotary motion/linear motion). When the second side wall is reached, the winding operation is interrupted and the next cage, formed from eight further cross-bars, is fitted at a defined distance of 1 to 2 cm from the first cage. The winding operation which has already been described for the first cage is continued, with the linear motion now in the opposite direction. When the first side wall is reached, the winding operation is interrupted again and the next cage, formed from eight further cross-bars, is fitted at a defined distance of 1 to 2 cm from the second cage. Then, the wire is applied to the third cage in the same way as described for the first cage. The procedure is continued in this way until the outermost cage is reached. After the last layer of wire has been applied to the outermost cage, the wire end is secured to the side plate. With the product carrier selected as an example, it is in this way possible to accommodate up to 2000 m of wire in ten successive cage layers. The method is diagrammatically depicted in FIG. 1.

Since the winding process can be automated, the product carrier is fitted with wire after at most 120 minutes. Then, the product carrier to which the wire has been fitted is introduced into a batch coating apparatus which is known from the prior art and is standard for coating operations of this type. It passes through the various standard pretreatment and rinsing steps and finally the coating bath. The time required to pass through the installation is at most 90 minutes.

The coated wire is wound up to form a coil of wire in a similar way to the way in which it was fitted to the product carrier, but in the reverse order. This requires unwinding times of at most 90 minutes. The coated wire is preferably also subjected to a heat treatment, but may be used directly in a saw.

The result, therefore, is an overall treatment time of at most 5 hours for 2000 m of wire; i.e., despite the use of the chemical coating process, which is slower for process reasons, a throughput time which is faster by a factor of 100 than the process described in JP-A-63-22275 is achieved. The efficiency of the process is even more emphatic when it is compared with a chemical coating process in a continuous passage installation. In this case, it is possible to improve the throughput time by a factor of 250.

The wire length which can be coated per batch can be increased further by selecting larger product carriers and therefore larger treatment baths. For example, on larger product carriers, 7500 m of wire may be coated in one batch using the processes described and the total treatment time will be at most 8 hours. The passage time per m of coated wire is therefore even shorter with larger product carriers.

At the locations at which there was contact between the wire surface and the bar of the cage, the wire inevitably has points which are uncoated. On account of the shielding effect of the cage bar, a zone with a reduced level of embedded particles, which corresponds to at most a quarter of the cage bar circumference and therefore in the example described has a size of at most 6 mm, is formed in the vicinity of the these points. Depending on the diameter of the cage in question, these zones occur at intervals of 40 mm to 122 mm. Surprisingly, sawing tests carried out using single-wire saws and multiwire saws have shown that these zones do not have any adverse effect on the performance, service life or fracture strength of the coated wire.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for the coating of a wire with abrasive particles in a metal matrix in a batch coating apparatus, comprising winding the wire onto a product carrier in a plurality of layers, said layers in a spaced relationship from a next layer, and coating the wire in a coating apparatus in batch mode, wherein said product carrier comprises wire carriers comprising carrier rods around which wire is wound, adjacent turns of wire being spaced apart from one another, and contacting the wire carriers at points of the carrier rods around which the wire is wrapped, the wire carriers adapted in size and arranged in space to form a series of nested wire carriers spaced apart from each other.

2. The method of claim 1, wherein the batch coating apparatus comprises at least one pretreatment bath and at least one coating bath, and optionally one or more rinsing baths.

3. The method of claim 1, wherein said wire comprises a single wire of 1000 m or greater length.

4. A method for the coating of a wire with abrasive particles in a metal matrix in a batch coating apparatus, comprising winding the wire onto a product carrier, and coating the wire in a coating apparatus in batch mode, further comprising
   a) selecting as a product carrier, a product carrier comprising a plurality of open reels of increasingly greater size, each open reel comprising a plurality of removably mountable parallel carrier rods arranged in a geometric pattern;
   b) mounting a first plurality of carrier rods to form a first open reel and winding wire around said first open reel;
   c) mounting a plurality of carrier rods outside of said first open reel and in spaced relation to said first open reel to form a second open reel and winding wire around said second open reel; and
   d) optionally mounting a subsequent plurality of carrier rods outside of prior open reels and in spaced relation to the last open reel formed, and winding wire around said subsequent open reel; and
   e) optionally repeating step d) one or more times.

5. The method of claim 4, wherein each open reel comprises a plurality of carrier rods positioned parallel to each other along points of a circle concentric about an axis common to all open reels.

6. The method of claim 5, wherein said carrier rods are positioned between two side plates, each side plate having an inner face, an outer face, and a periphery.

7. The method of claim 6, wherein said two side plates are connected by means of a central spindle, said spindle defining said axis common to said open reels.

8. The method of claim 6, wherein said wire comprises a single wire of 1000 m or greater length.

9. The method of claim 5, wherein said wire comprises a single wire of 1000 m or greater length.

10. The method of claim 4, wherein said carrier rods are positioned between two side plates, each side plate having an inner face, an outer face, and a periphery.

11. The method of claim 10, wherein a side plate comprises a drive wheel which can be driven to provide rotary motion in the treatment baths of said batch coating apparatus.

12. The method of claim 11, wherein said drive wheel is secured to the outer face of at least one side plate.

13. The method of claims 10, comprising mounting a plurality of carrier rods with a defined arc spacing between the side plates at a defined distance from a central axis to form an open reel, securing a wire end of a wire which is to be coated from a stock reel to a region on one side plate or to a carrier rod, rotating the product carrier in a first direction of rotation and supplying wire in a linear motion parallel to the center spindle of the product carrier, the wire being wound onto the cage with a pitch defined by the rates of rotary and linear motions, when the second side wall is reached, interrupting the winding operation and forming a subsequent open reel from further carrier rods at a distance from the first open reel, continuing the winding operation described above for the first cage, with the linear motion in the opposite direction, when the first side wall is reached, interrupting the winding operation again and forming a subsequent open reel from further carrier rods at a distance from the last open reel, winding wire to the subsequent open reel as described for the first open reel, the procedure being continued until an outermost open reel is reached, and after winding the last layer of wire about the outermost open reel, securing the end of the wire to a side plate.

14. The method of claim 10, wherein at least one of said side plates further comprises an encircling recess in a face thereof or in the periphery thereof, said recess capable of containing a length of wire which is not exposed to a coating bath.

15. The method of claim 10, wherein said wire comprises a single wire of 1000 m or greater length.

16. The method of claim 4, wherein said wire comprises a single wire of 1000 m or greater length.

* * * * *